(12) United States Patent
Schomp

(10) Patent No.: US 8,868,783 B2
(45) Date of Patent: Oct. 21, 2014

(54) ABSTRACT REPRESENTATION OF SUBNET UTILIZATION IN AN ADDRESS BLOCK

(75) Inventor: Craig Schomp, Stow, MA (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 11/728,652

(22) Filed: Mar. 27, 2007

(65) Prior Publication Data
US 2008/0244054 A1    Oct. 2, 2008

(51) Int. Cl.
*G06F 15/16*    (2006.01)
*H04L 29/12*    (2006.01)

(52) U.S. Cl.
CPC ...... *H04L 29/12283* (2013.01); *H04L 61/2061* (2013.01)
USPC ........... 709/245; 709/220; 709/223; 709/226; 709/203; 370/389; 370/254; 370/395.3; 715/734; 715/735; 715/736

(58) Field of Classification Search
USPC .......................... 709/245, 220, 223–226, 203; 715/734–736; 370/389, 254, 395.3
See application file for complete search history.

(56) References Cited

U.S. PATENT DOCUMENTS

| | | | |
|---|---|---|---|
| 6,654,803 B1 * | 11/2003 | Rochford et al. | 709/224 |
| 7,523,189 B2 * | 4/2009 | Boylan et al. | 709/223 |
| 2004/0123181 A1 * | 6/2004 | Moon et al. | 714/13 |
| 2005/0076144 A1 * | 4/2005 | Boylan et al. | 709/245 |
| 2005/0286518 A1 * | 12/2005 | Park et al. | 370/389 |
| 2006/0126636 A1 * | 6/2006 | Dooley et al. | 370/395.3 |
| 2007/0011297 A1 * | 1/2007 | Boylan et al. | 709/223 |
| 2007/0286374 A1 * | 12/2007 | Romeo | 379/142.07 |
| 2009/0222547 A1 * | 9/2009 | Boylan et al. | 709/223 |

OTHER PUBLICATIONS

Net-Map-Status, Acquired at: .internetassociatesllc.com/images/net-map-status.gif, 1 page.
Net-Map-Owner, Acquired a.internetassociatesllc.com/images/net-map-owner.gif, 1 page.
J. Mogul, et al., "Internet Standard Subnetting Procedure", Network Working Group, Request for Comments: 950, 18 pages, Aug. 1985.

* cited by examiner

*Primary Examiner* — Khaled Kassim
(74) *Attorney, Agent, or Firm* — Edwards Wildman Palmer LLP; James M. Behmke; Stephen D. LeBarron

(57) ABSTRACT

In one embodiment, a method to display a visual representation of subblock utilization in an address block is provided. A plurality of subblock sizes in the address block are determined. A subblock may be referred to as a subnet or subblock but is a portion of the addresses in the address block. The size for the subblocks is determined for each of the subblocks based on which address spaces have been assigned to each of the subblocks. Also, a positioning within the address block is determined based on which address space has been assigned to each of the subblocks. A utilization for the plurality of subblocks is then determined. The utilization may be a determination based on how many addresses have been leased in the subblock. A visual representation is then generated that shows the size of the subblocks relative to each other and also showing a utilization measurement for the subblocks.

12 Claims, 4 Drawing Sheets

(12) United States Patent

ABSTRACT REPRESENTATION OF SUBNET UTILIZATION IN AN ADDRESS BLOCK

TECHNICAL FIELD

Particular embodiments generally relate to networking.

BACKGROUND

An authority may issue address blocks to various service providers. An address block may be a block of Internet Protocol (IP) addresses that are used to identify devices in a network. The service provider may then assign subblocks of the address block to various clients. For example, one subblock may be assigned to a region, such as Boston, and another subblock may be assigned to another region, such as New York. The subblocks represent a range of logical addresses within the address block. These addresses may be assigned to various devices. For example, as devices log on to a network, they may be dynamically assigned an IP address from a subblock.

The service provider may want to determine what the utilization is of certain subblocks. The utilization may be how many IP addresses have been leased to devices in the subblock. When this is desired, a printout of the list of subblocks that have been assigned may be generated. However, this list is hard to read and does not relay any information about how many IP addresses have been leased in a subblock.

DESCRIPTION OF EXAMPLE EMBODIMENTS

Overview

In one embodiment, a method to display a visual representation of subblock utilization in an address block is provided. For example, a visual representation of an address block space may be shown in a graphical user interface. A plurality of subblock sizes in the address block are determined. A subblock may be referred to as a subnet or subblock but is a portion of the addresses in the address block. The subblock may be a subnetwork in a network. The size for the subblocks is determined for each of the subblocks based on which address spaces have been assigned to each of the subblocks. Also, a positioning within the address block is determined based on the first of the sequential addresses that has been assigned to each of the subblocks. A utilization for the plurality of subblocks is then determined. The utilization may be a determination based on how many addresses have been leased in the subblock. A visual representation is then generated that shows the size of the subblocks relative to each other and also showing a utilization measurement for the subblocks. Further, a positioning of each subblock within the address space is shown. Accordingly, the user may look at the visual representation and determine how big each subblock is, what the utilization is, and the positioning of the subblock within the address space. Also, space that has not been assigned may be determined from the visual representation because the positioning of the subblocks within the address space would show space that has not been assigned.

Example Embodiments

Figure 1:
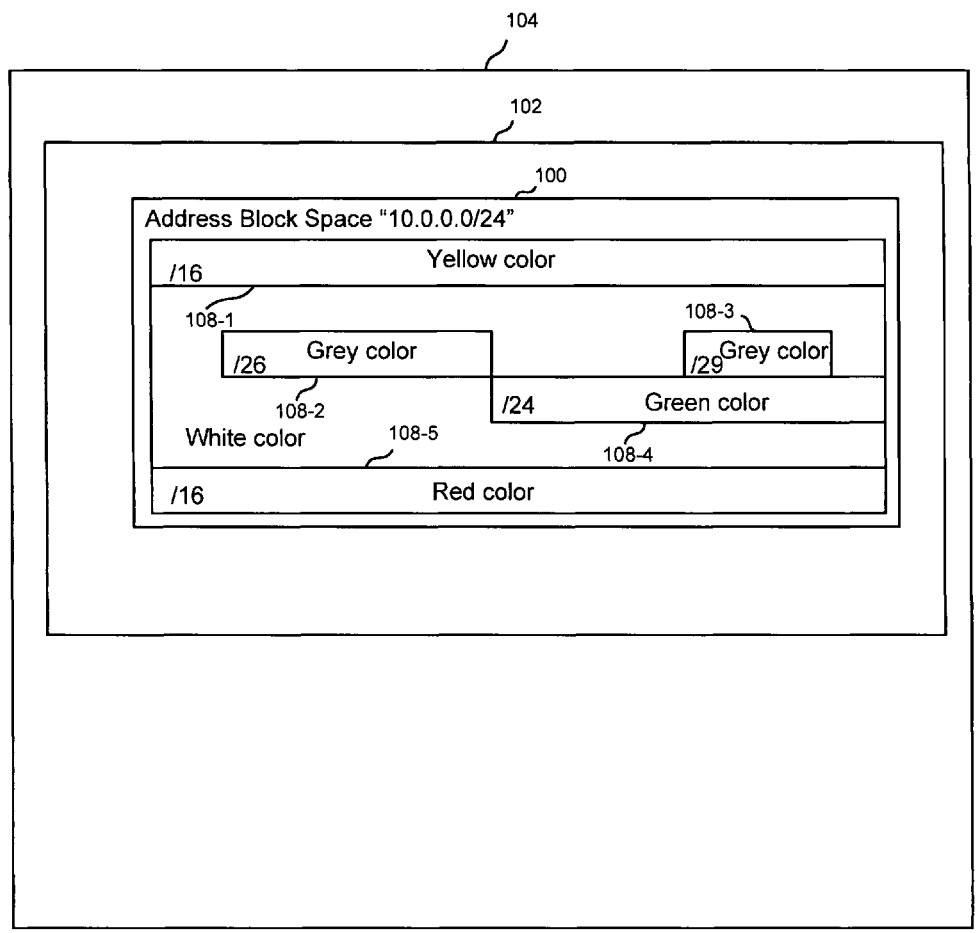
FIG. 1 shows an interface that may be shown on a display of a device.

FIG. 1 shows an interface 100 that may be shown on a display 102 of a device 104. Although interface 100 is shown on display 102, it will be understood that the visual representation may be shown on other media, such as a paper media or other electronic media.

Display 102 may be any display capable of displaying the visual representation of interface 100. For example, display 102 may be a liquid crystal display (LCD), television, monitor, etc. Device 104 may be any computing device capable of displaying interface 100. For example, device 104 may be a personal computer, workstation, server, personal digital assistant (PDA), cellular telephone, pocket PC, desktop computer, etc.

Interface 100 may be a graphical user interface that displays a visual representation of an address block space. An address block may be an IP address space allocation. The IP address space allocation may include a range of IP addresses. An IP address is a unique address that a device can use to identify itself and communicate with other devices on a computer network. IP addresses may be managed and created by the Internet Assigned Numbers Authority (IANA). The IANA generally assigns blocks to registries who then can assign smaller blocks to Internet service providers and enterprises. The format of IP addresses is described in different protocols, such as IPv4, IPv6, etc. Although IP addresses are discussed, it will be understood that other address spaces may be visually represented.

The address block may be broken up into various subblocks. A subblock is a subset of the address block. For example, an address block may be assigned to a service provider. The service provider may then assign various subblocks to clients, such as enterprises. A subblock may be referred to as a subnet or subnetwork. The subnet is a range of logical addresses within the address block. Breaking the address block into various subblocks may be a hierarchical partitioning of the address block.

As shown in the visual representation, an address block space for the network address of "10.0.0.0/24" is provided. This represents a range of network addresses that can be allocated.

In the address block space, various subblocks 108 may be allocated. Each subblock 108 represents a size of network addresses that have been allocated to the subblock. As shown, each subblock is represented by a rectangular shape. The size of the rectangular shape indicates a relative allotment of the number of network addresses that have been allocated to each subblock 108. For example, if subblock 108 is longer in length than another subblock, this indicates that this subblock includes a larger allocation of network addresses. As shown, subblock 108-1 has been allocated more network addresses than subblock 108-2, 108-3, and 108-4. This is because the length of subblock 108-1 is longer than subblocks 108-2, 108-3, and 108-4. Although a rectangle shape is shown, it will be understood that other shapes may be appreciated. For example, circular shapes, or other graphical shapes may be used to indicate a relative allocation of network addresses.

A utilization measurement is also shown for each subblock 108. Because network addresses may be dynamically assigned, different states may result for network addresses in subblocks 108. Depending on the different states, a utilization measurement is determined. For example, the utilization measurement may be a measure of how many network addresses have been leased to clients in a subblock 108. The term lease may be defined to mean a state of a network address. For example, lease may mean that a network address has been assigned to a device.

In one embodiment, a visual representation of the utilization measurement is provided in interface 100. For example, different colors may represent different utilization measurements. For example, the colors green, yellow, and red represent that a subblock 108 may be 0-70% used, 71-90% used, and 91-100% used, respectively. A gray color may represent defined subblock space that is defined and not yet assigned to the next client. Also, a white color may represent undefined subblock space. The colors in FIG. 1 are shown with labels but it will be understood that subblocks 108 may be colored with the appropriate colors in interface 100. Other representations may also be used, such as different patterns, text, etc. For example, different shading may be used to represent utilization measurements. Also, different patterns, such as dotted, slashes, etc. may be used. Text may also describe the utilization measurement.

Also, a positioning of each subblock 108 within the address block may be visually represented. For example, subblock 108-1 may be at the beginning of the address block and subblock 108-5 may be at the end of the address block. Also, subblocks 108-2 and 108-3 may be in the middle of the address block. Further, subblock 108-2 may represent addresses that come before addresses in subblock 108-3.

Figure 2:
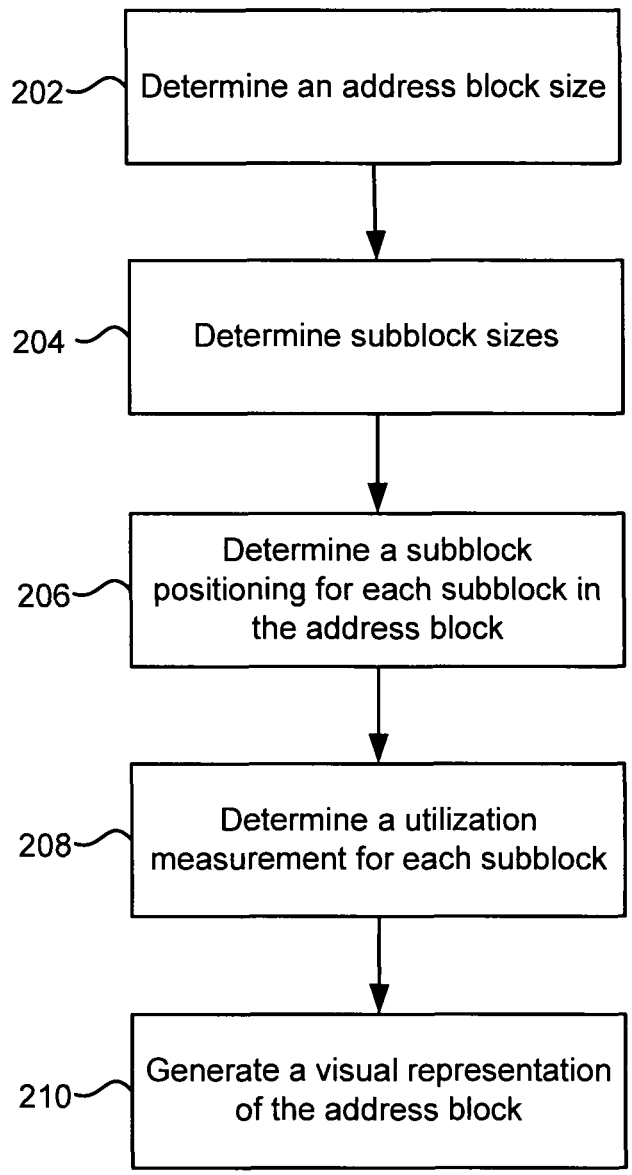
FIG. 2 depicts an example method for generating a visual representation.

The above factors are used generating a visual representation. FIG. 2 depicts an example method for generating a visual representation. Step 202 determines an address block size. For example, the address block size may be determined by the number of network addresses assigned to the address block.

Step 204 determines subblock sizes. For example, the subblock sizes that have been allocated to clients are determined. This may be a range of network addresses that are included in each subblock 108.

Step 206 determines a subblock positioning for each subblock 108 in the address block. The positioning may be where in the range of addresses each subblock is located.

Step 208 determines a utilization measurement for each subblock 108. For example, a number of network addresses that have been leased in a subblock 108 are determined. This number is then used to determine a utilization measurement. The utilization measurement may vary based on different algorithms that are used. In one example, the utilization measurement may be the number of network addresses that have been leased divided by the total number of possible network addresses in subblock 108. Other methods of determining the utilization measurement may also be appreciated.

Step 210 then generates a visual representation of the address block. For example, the visual representation may be displayed, stored, printed, etc. In one example, the visual representation is displayed of interface 100 on display 102. Further, the visual representation may be stored in storage, printed on a printer, or by using any other method.

The utilization of network addresses may change over time. For example, network addresses may be dynamically assigned to devices that are located on a network. In one example, dynamic host configuration protocol (DHCP) may be used to allow a device to request and obtain a network address from a DHCP server that may be in control of leasing network addresses from a subblock 108. When a computer logs on or is added to a network, it may be dynamically assigned a network address in subblock 108. When an address is assigned, it may be considered leased. At some point, the computer may log off or disconnect from the network. Accordingly, the network address state changes because it is no longer in use by that computer. The address may go back into a pool of available network addresses in subblock 108 that can be leased by other devices. This process is ongoing and may affect the utilization measurement for subblocks 108.

Figure 3:
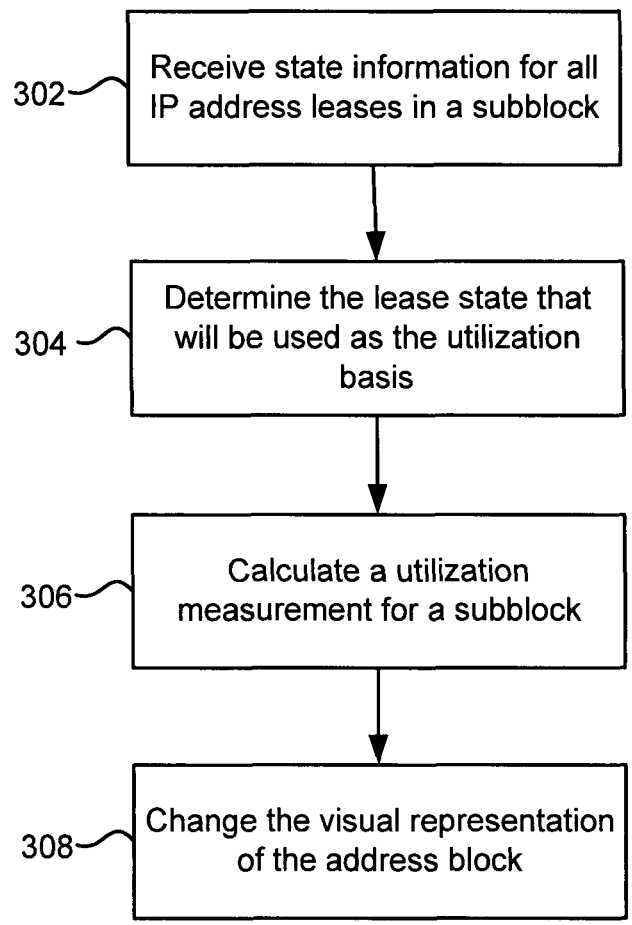
FIG. 3 depicts an example method for determining the utilization measurement.

Accordingly, FIG. 3 depicts an example method for determining the utilization measurement. Step 302 receives state information for all the IP address leases in a subblock 108. For example, the information may be received from a DHCP server that assigns a network address to a device. Also, the information may be received from other devices. For example, the assignments of network addresses may be sent to an aggregation device that may aggregate a number of network addresses that have been assigned. This device may then send a summary of the utilization to a device that can determine the utilization measurement. Further, a device may snoop or intercept the assigning of network addresses by a DHCP server.

Step 304 then determines the lease state that will be used as the utilization basis. For example, nine states may be provided for a network address. These states may include available, offered, leased, expired, unavailable, released, other available, pending available or unmanaged.

Step 306 then calculates a utilization measurement for a subblock. As discussed above, different algorithms may be used to determine the utilization measurement. For example, each of the states may be individually measured or mapped to one of two measurements, used and unused. A used network address may be one that is being currently used by a device, i.e., leased. In this case, the device is connected to a network that has been assigned a network address. The unused category may be a state where the network address has not been assigned to a device or is eligible to be assigned to a device. Thus, it is unused. Accordingly, a utilization measurement may be the number of used network addresses as compared to the total number of network addresses in a subblock 108. Thus, the percentage utilization shows the percentage of network addresses that are currently being used. Other measurements may be used, such as showing the percentage of network addresses that are eligible to be leased, etc.

Step 308 then changes the visual representation of interface 100, if necessary. For example, if a utilization measurement changes to a different range, then a color may be changed. For example, if the utilization measurement moves from 65% to 75%, then a color of subblock 108 may be changed from green to yellow.

In one embodiment, the change in the visual representation of interface 100 may occur in real-time. For example, interface 100 may be shown on display 102 and the color may change once the new utilization measurement is calculated. Also, the change may occur when a new interface 100 is generated.

Figure 4:
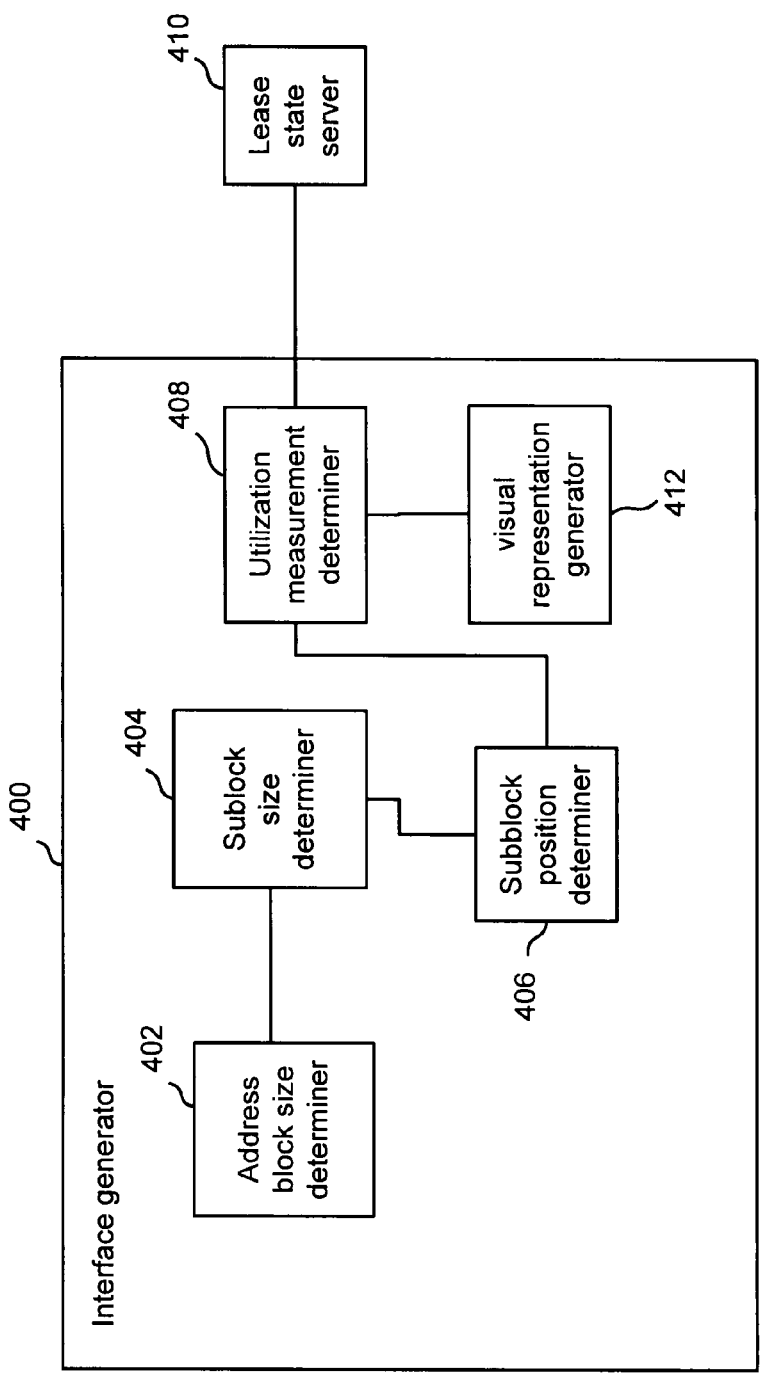
FIG. 4 shows an example of an interface generator.

FIG. 4 shows an example of an interface generator 400. As shown, interface generator 400 includes an address block size determiner 402, a subblock size determiner 404, a subblock position determiner 406, a utilization measurement determiner 408, and a visual representation generator 412.

Address block size determiner 402 is configured to determine the size of an address block. This size is used to determine how to visually represent subblocks within the address block. For example, larger address blocks may be represented by larger address block sizes in interface 100.

Subblock size determiner 404 is configured to determine a size of each subblock 108. The size may be determined relative to other subblocks. For example, subblocks 108 that have been allocated more space, such as more addresses in the address block, are determined to be of a bigger size, either in length or in width, than subblocks 108 that have been allocated fewer addresses.

Subblock position determiner 406 determines a position of each subblock 108 relative to each other in the address block. For example, based on the address space allocated to a subblock 108, a position within the address space is determined.

Utilization measurement determiner 408 determines a utilization measurement for one or more subblocks 108. For example, utilization measurement determiner 408 may receive utilization information from a lease state server 410. Lease state server 410 may be a DHCP server that is assigning dynamic addresses for a subblock. Any number of lease state servers 410 may be providing this information to utilization measurement determiner 408. Lease state server 410 may also be devices other than a DHCP server, such as any device that can determine lease states of network addresses in a subblock 108. When the lease states are determined, utilization measurement determiner 408 is configured to determine the utilization measurement for one or more subblocks 108.

Visual representation generator 412 is then configured to generate a visual representation of the address block. For example, the size, positioning, and utilization measurement may be used to generate the visual representation.

Particular embodiments provide many advantages. For example, a user may quickly look at the visual representation and determine useful information about the address block. The user may quickly see the size of each subblock 108, the position of each subblock 108 within the address block, and the utilization of the block. Seeing the utilization of a block by looking at the utilization indication is a quick way to determine an estimated utilization of a subblock 108. Thus, if the utilization of a subblock 108 is getting to be high, then the user may want to allocate more network addresses to a client. To determine which addresses to allocate, the user may look at the visual representation and make a quick estimation. For example, the white or gray space indicates address space that has not been allocated or assigned in the address block. Thus, the user may then determine that this address space may be allocated. Accordingly, the positioning of subblocks within the visual representation allows a quick determination of which address space has not been allocated to subblocks 108.

Although the description has been described with respect to particular embodiments thereof, these particular embodiments are merely illustrative, and not restrictive. For example, information other than IP addresses may be shown in a visual representation.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A system for outputting real-time network usage information in a network, the system comprising:
    an address block size determiner connected to a subblock size determiner, the address block size determiner configured to determine a size of an address block used to identify devices in a network, the address block being arranged in subblocks of device addresses;
    the subblock size determiner connected to a subblock position determiner, the subblock size determiner configured to determine a size of a subblock in the subblocks;
    the subblock position determiner connected to a utilization determiner, the subblock position determiner configured to determine a position of the subblock in the subblocks;
    the utilization determiner connected to a visual representation generator, the utilization determiner configured to determine a utilization measurement in real time for the subblock, the utilization measurement comprising:
        utilization information for the subblock the utilization information comprising a determination of a lease state for each of a number of network addresses in the subblock that are used by the devices in the network, and
        a usage range, the usage range comprising a percentage of used network addresses in the subblock and includes:
            a low range from approximately 0 percent to approximately 70 percent,
            a medium range from approximately 71 percent to approximately 90 percent, and
            a high range from approximately 91 percent to approximately 100 percent, and
    the visual representation generator configured to output a visual display in a graphical user interface (GUI) that represents the subblocks and related real-time network usage information for the network, the GUI comprising a graphical representation of the subblocks including:
        a geometric representation of subblock size and position for each of the subblocks relative to one another by using determined subblock sizes and determined subblock positions, and
        a visual representation of the geometric representation configured to represent the usage range of the determined utilization measurements for each of the subblocks, the visual representation of the geometric representation being configured to be updated in real time for at least one of the subblocks in response receiving information for a change in utilization measurements from at least a first usage range to a second usage range for the subblock.

2. The system of claim 1, wherein the system is configured to employ different colors or patterns to indicate different predetermined levels of utilization, and wherein:
    a first color represents the low range,
    a second color represents the medium range, and
    a third color represents the high range.

3. The system of claim 2, wherein
    the first color is represented by a green color,
    the second color is represented by a yellow color, and
    the third color is represented by a red color.

4. The system of claim 1, further comprising a server, wherein:
    the server of the subblock is configured to dynamically assign addresses for the subblock, and
    the subblock size determiner is further configured to determine the size of the subblock relative to the other subblocks in the plurality of subblocks.

5. A method for outputting real-time network usage information in a network, the method comprising:
    determining, in an address block size determiner, a size of an address block used to identify devices in a network, the address block being arranged in subblocks of device addresses;
    determining, in a subblock size determiner, a size of a subblock in the subblocks;
    determining, in a subblock position determiner, a position of the subblock in the subblocks;
    determining, in a utilization determiner, a utilization measurement in real time for the subblock, the utilization measurement comprising:
        utilization information for the subblock the utilization information comprising a determination of a lease state fore each of a number of network addresses in the subblock that are used by the devices in the network, and
        a usage range, the usage range comprising a percentage of used network addresses in the subblock and includes:
            a low range from approximately 0 percent to approximately 70 percent, a medium range from approximately 71 percent to approximately 90 percent, and a high range from approximately 91 percent to approximately 100 percent, and outputting, from a visual representation generator, a visual display in a graphical user interface (GUI) that represents the subblocks and related real-time network usage information for the network, the GUI comprising a graphical representation of the subblocks including:

a geometric representation of subblock size and position for each of the subblocks relative to one another by using determined subblock sizes and determined subblock positions, and a visual representation of the geometric representation configured to represent the usage range of the determined utilization measurements for each of the subblocks, the visual representation of the geometric representation being configured to be updated in real time for at least one of the subblocks in response receiving information for a change in utilization measurements for the subblock.

6. The method of claim 5, further comprising representing different predetermined levels of utilization with different colors or patterns, and wherein:

a green color represents the low range, a yellow color represents the medium range, and a red color represents the high range.

7. The method of claim 5, further comprising utilizing a server to dynamically assign addresses for the subblock.

8. The method of claim 5, further comprising determining the size of the subblock that is relative to the other subblocks in the plurality of subblocks.

9. A non-transient computer-readable medium for outputting real-time network usage information in a network, the non-transient computer-readable medium comprising instructions to cause a computer to perform operations comprising:

determining, in an address block size determiner, a size of an address block used to identify devices in a network, the address block being arranged in subblocks of device addresses;

determining, in a subblock size determiner, a size of a subblock in the subblocks;

determining, in a subblock position determiner, a position of the subblock in the subblocks;

determining, in a utilization determiner, a utilization measurement in real time for the subblock, the utilization measurement comprising:

utilization information for the subblock the utilization information comprising a determination of a lease state for each of a number of network addresses in the subblock that are used by the devices in the network, and a usage range, the usage range comprising a percentage of used network addresses in the subblock and includes:

a low range from approximately 0 percent to approximately 70 percent, a medium range from approximately 71 percent to approximately 90 percent, and a high range from approximately 91 percent to approximately 100 percent, and outputting, from a visual representation generator, a visual display in a graphical user interface (GUI) that represents the subblocks and related real-time network usage information for the network, the GUI comprising a graphical representation of the subblocks including:

a geometric representation of subblock size and position for each of the subblocks relative to one another by using determined subblock sizes and determined subblock positions, and a visual representation of the geometric representation configured to represent the usage range of the determined utilization measurements for each of the subblocks, the visual representation of the geometric representation being configured to be updated in real time for at least one of the subblocks in response receiving information for a change in utilization measurements from at least a first usage range to a second usage range for the subblock.

10. The non-transient computer-readable medium of claim 9, further comprising instructions such that the computer is configured to employ different colors or patterns to indicate different predetermined levels of utilization, and wherein:

a green color represents the low range, a yellow color represents the medium range, and a red color represents the high range.

11. The non-transient computer-readable medium of claim 9, further comprising instructions to cause the subblock size determiner to determine the size of the subblock relative to the other subblocks in the plurality of subblocks.

12. The non-transient computer-readable medium of claim 9, further comprising instructions that are executable with a server, wherein the server of the subblock is configured to dynamically assign addresses for the subblock.

* * * * *